United States Patent [19]

Petit

[11] 4,243,562

[45] Jan. 6, 1981

[54] PROCESS FOR THE POLYMERIZATION OF VINYL CHLORIDE IN AQUEOUS SUSPENSION UTILIZING AN OIL-SOLUBLE INITIATOR AND SUBSEQUENTLY A WATER-SOLUBLE INITIATOR AND USE OF THE POWDERS OBTAINED THEREBY

[75] Inventor: André Petit, Brussels, Belgium

[73] Assignee: Solvay & Cie., Brussels, Belgium

[21] Appl. No.: 911,811

[22] Filed: Jun. 2, 1978

[30] Foreign Application Priority Data

Jun. 7, 1977 [FR] France .............................. 77 17798

[51] Int. Cl.$^2$ ..................... C08F 2/20; C08F 14/06
[52] U.S. Cl. ................................. 260/17 A; 429/247; 526/344; 526/345; 526/910; 526/911
[58] Field of Search .............. 260/17 A; 526/910, 911

[56] References Cited

U.S. PATENT DOCUMENTS

| | | | |
|---|---|---|---|
| 3,293,199 | 12/1966 | Abercrombie | 260/17 A |
| 3,666,720 | 5/1972 | Nield et al. | 260/17 A |
| 3,766,106 | 10/1973 | Yurimoto et al. | 260/17 A |
| 3,951,925 | 4/1976 | Mishima et al. | 521/145 |
| 4,029,619 | 6/1977 | Tajima et al. | 526/345 |

*Primary Examiner*—Edward M. Woodberry
*Attorney, Agent, or Firm*—Spencer & Kaye

[57] ABSTRACT

Process for the polymerization of vinyl chloride in aqueous suspension in the presence of a dispersing system comprising a cellulosic derivative and an anionic emulsifying agent wherein the polymerizaton is initiated by an oil-soluble initiator and a water-soluble free radical polymerization initiator is added in the course of polymerization. The thus obtained polyvinyl chloride powders are particularly suitable for the production of battery separators.

10 Claims, No Drawings

PROCESS FOR THE POLYMERIZATION OF VINYL CHLORIDE IN AQUEOUS SUSPENSION UTILIZING AN OIL-SOLUBLE INITIATOR AND SUBSEQUENTLY A WATER-SOLUBLE INITIATOR AND USE OF THE POWDERS OBTAINED THEREBY

BACKGROUND OF THE INVENTION

The present invention relates to a process for the polymerization of vinyl chloride in aqueous suspension and the use of the polyvinyl chloride powders obtained by this process in the production of separator plates for batteries and accumulators (battery separators).

The qualities demanded of the powdered resins to be used in the production of battery separators include good wettability and a low average particle size that will ensure that separators with low diameter pores are obtained. It is for this reason that polyvinyl chloride powders obtained by polymerization in aqueous emulsion are customarily recommended for use in this particular application. It has in fact been found that powdered polymers obtained in aqueous emulsion exhibit good processing characteristics on the whole. Thus, they can be sintered and can be readily applied with a doctor knife or roll. Furthermore, the wettability of the resulting separators is generally satisfactory. Nevertheless, they are unsatisfactory as regards resistivity and mechanical strength and tend to cause foaming due to their high emulsifier content.

Published French Patent Application No. 71.20132 filed on June 3rd, 1971, in the name of the Sumitomo Chemical Co. Ltd., (and corresponding U.S. Pat. No. 3,766,106) describes the production of polyvinyl chloride powders by the polymerization of vinyl chloride in aqueous suspension in the presence of an oil-soluble initiator and a dispersing agent system comprising a cellulose derivative and an anionic emulsifying agent. It is stated therein that a powdered polyvinyl chloride of this kind exhibits good mechanical and electrical properties, but is nevertheless unsuitable for the production of battery separators when used alone because of its poor application characteristics, whether a doctor knife or roll is used, and particularly because of its poor sintering properties.

The same patent recommends using, in the production of battery separators, compositions comprising a mixture of 95 to 50% by weight of a powdered polyvinyl chloride of this kind prepared by polymerization in aqueous suspension and 5 to 50% by weight of a powdered polyvinyl chloride prepared by polymerization in aqueous emulsion together with 0.1 to 3 parts by weight per 100 parts of the mixture of a non-ionic antistatic agent. The addition of polyvinyl chloride powder obtained in aqueous emulsion and a non-ionic antistatic agent in the proportions specified above admittedly improves the sintering characteristics and the machining properties of the polyvinyl chloride powder obtained in aqueous suspension. However, the mechanical properties of the resulting sintered separators are impaired and the separators always exhibit a tendency to cause foaming.

It would therefore appear that the battery separators obtained from the prior art compositions do not possess optimum properties. Furthermore, the preparation of such compositions is complicated due to the fact that it requires the production of polyvinyl chloride powders from two different formulations and their eventual mixing with an antistatic agent.

SUMMARY OF THE PRESENT INVENTION

There has now been found, in accordance with the present invention, a particularly simple method for directly obtaining polyvinyl chloride in the form of powders capable of being sintered that are suitable for the production of good quality battery separators that do not possess the above drawbacks.

The present invention provides a process for the polymerization of vinyl chloride in aqueous suspension in the presence of an oil-soluble free radical polymerization initiator and a dispersing agent system comprising a cellulose derivative and an anionic emulsifying agent, comprising: conducting the polymerization initially in the presence of the oil-soluble initiator and adding a water-soluble free radical initiator during polymerization.

It has, in fact, been found that if the polymerization of vinyl chloride in aqueous suspension is initiated with an oil-soluble initiator in the presence of a cellulosic dispersing agent and an anionic emulsifying agent and a water-soluble initiator is added during polymerization, it is possible directly to obtain powdered vinyl chloride polymers capable of being sintered and suitable for use in the production of battery separators having good electrical and mechanical properties.

It is to be understood that both the foregoing general description and the following detailed description are exemplary, but are not restrictive of the invention.

DETAILED DESCRIPTION OF THE INVENTION

In the practice of the present invention, the moment at which the water-soluble free radical initiator is added is not particularly critical provided addition takes place during polymerization. It can therefore be effected at any point during polymerization, i.e., after the start, but before the end of polymerization. By end of polymerization, it is meant the moment at which, having achieved the desired conversion, the polymerization reactor is vented by reducing the pressure. Polymerization is customarily terminated by venting when conversion has reached about 85 to 95%. Generally speaking, the water-soluble initiator is therefore added before conversion has reached 85%. It is particularly advantageous to add it before conversion exceeds 80%.

It is not, however, advisable to introduce the water-soluble initiator into the polymerization medium while conversion is still relatively low, generally below about 60%. To obtain a powdered polyvinyl chloride with optimum properties, it is preferable to introduce the water-soluble initiator after conversion has reached at least 70%.

According to a preferred embodiment of the present invention, a water-soluble free radical polymerization initiator is therefore added to the polymerization medium when conversion is between about 70 and 80%, and polymerization is then continued until conversion has reached a value of 85 to 95%. Polymerization is customarily continued at the same temperature.

The nature of the water-soluble initiator is not critical, and in general, all free radical initiators for polymerization in aqueous emulsion are suitable. Examples of such initiators include per-salts, per-acids and hydrogen peroxide. It is preferable to use inorganic per-salts, more particularly alkali metal and ammonium persulfates, or hydrogen peroxide.

If an inorganic per-salt, such as a potassium or ammonium persulfate, is used it may be desirable to add also a basic substance (e.g. an alkali metal hydroxide or ammonium hydroxide) to the initial polymerization charge if it is desired to obtain separators with optimum heat stability. The amount of base to use can be readily determined experimentally in each particular case. As a guide, an amount of about 0.1 to 1 part by weight per 1,000 parts of vinyl chloride is generally sufficient to improve the heat stability of the polyvinyl chloride.

Either one or more water-soluble initiators may be used equally well. If several water-soluble initiators are used, they can be introduced at different times. They may equally well be added batchwise or continuously.

The amount of water-soluble initiator to be introduced into the aqueous suspension is not critical. It depends to some extent on the polymerization temperature and the chemical nature of the water-soluble initiator. As a guide, the introduction of very small amounts of water-soluble initiator of as little as about 0.1 per mil by weight of the vinyl chloride employed generally results in an improvement in the properties of the polyvinyl chloride powders and particularly their suitability for sintering. The introduction of larger amounts of water-soluble initiator intensifies this improvement. However, it is generally preferred not to exceed an amount of 3 per mil by weight. If the water-soluble initiator is an inorganic per-salt, the preferred concentration of water-soluble initiator is generally between about 0.15 and 1 per mil. If it is hydrogen peroxide, the preferred concentration range is between about 0.5 and 2.5 per mil.

The nature of the oil-soluble initiator used at the start of polymerization in aqueous suspension is not critical. Generally speaking, all oil-soluble initiators normally used for this type of polymerization are suitable. However, the best results are obtained with higher dialkyl peroxydicarbonates and azo-bis-nitriles.

By higher dialkyl peroxydicarbonates, it is meant dialkyl peroxydicarbonates in which the alkyl chains, which may be the same or different and may optionally be substituted, contain at least 7 carbon atoms and preferably at least 12 carbon atoms. It is advantageous to use peroxydicarbonates whose alkyl chains are identical and each contain from 12 to 20 carbon atoms. Examples of such peroxydicarbonates include didecyl, dilauryl, dimyristyl, dicetyl and distearyl peroxydicarbonates. Dicetyl peroxydicarbonate is particularly preferred.

By azo-bis-nitrile, it is meant compounds of the general formula CN—R—N=N—R—CN in which R denotes a linear or branched alkylene chain containing from 2 to 10 carbon atoms, and preferably from 4 to 8 carbon atoms. Examples of such azo-bis-nitriles include azo-bis-isobutyronitrile, azo-bis-valeronitrile and azo-bis-2,4-dimethyl valeronitrile. Azo-bis-2,4-dimethyl valeronitrile is particularly preferred.

According to a preferred embodiment of the present invention, the polymerization of vinyl chloride in aqueous suspension is therefore initiated with an oil-soluble initiator selected from the higher dialkyl peroxydicarbonates and the azo-bis-nitriles (or a catalyst system containing these). A higher dialkyl peroxydicarbonate is preferably used.

The amount of oil-soluble initiator employed at the start of polymerization is not critical. It depends primarily on the half-life of the initiator under the polymerization conditions and on the heat exchange capacity of the system. From 0.01 to 0.5% by weight of the oil-soluble initiator (or mixture of oil-soluble initiators) calculated on the vinyl chloride is customarily employed. About 0.1% by weight of the oil-soluble initiator is preferably used.

The cellulosic dispersing agent used in the process of the present invention may be selected indiscriminately from all the water-soluble cellulose derivatives conventionally used for the polymerization of vinyl chloride in aqueous suspension. Examples of such derivatives include the alkyl celluloses such as methyl, ethyl and propyl cellulose, the hydroxy alkyl celluloses such as hydroxyethyl, hydroxypropyl and hydroxybutyl cellulose, and the mixed cellulose ethers such as (hydroxypropyl) (methyl) cellulose. Alkyl celluloses are preferably used. Methyl cellulose is particularly preferred.

The amount of cellulosic dispersing agent is customarily between 1 and 5 per mil by weight of the vinyl chloride initially used. The best results are obtained when from 2 to 2.5 per mil by weight are used.

The nature of the anionic emulsifying agent used in the process of the invention is not critical. However, the best results are obtained with sulfonated emulsifying agents. Examples of such emulsifying agents include the alkali metal salts, such as the sodium salt, of alkyl sulfonic, aryl sulfonic and alkyl arene sulfonic acids. The best results are obtained with alkali metal alkyl sulfonates and alkyl arene sulfonates, more particularly those in which the alkyl radicals contain from 8 to 16 carbon atoms. Alkali metal alkyl arene sulfonates are particularly preferred. Preference among these is given to sodium dodecyl benzene sulfonate.

Although the amount of anionic emulsifying agent to be used is not particularly critical, it is advisable to use very small amounts, generally appreciably below the amount of cellulose derivative employed. It is therefore advantageous to use an amount of from 0.1 to 2 per mil by weight calculated on the vinyl chloride initially used. The best results are obtained on using from 0.50 to 1.5 per mil by weight of anionic emulsifying agent.

According to a particularly preferred embodiment of the present invention, therefore, the polymerization of vinyl chloride in aqueous suspension is initiated in the presence of dicetyl peroxydicarbonate and a dispersing agent system based on methyl cellulose and sodium dodecyl benzene sulfonate, and hydrogen peroxide and/or an alkali metal or ammonium persulfate is added during polymerization when conversion is between 70 and 80%.

The polymerization temperature is not critical, and is generally between 50° and 75° C. and advantageously between 55° and 65° C. The resulting polymers generally possess K values, measured at 25° C. in cyclohexanone, of between 53 and 74 and preferably between 60 and 69. The polymerization pressure is of course equal to the saturated vapor pressure of the vinyl chloride at the polymerization temperature.

The amount of water used is customarily such that the total weight of monomers represents from 20 to 50% of the total of water plus monomers and advantageously from 40 to 50%. In some cases, particularly when a per-salt is used as the water-soluble initiator, it may be advantageous to initiate polymerization with a weight ratio of monomers to total charge of about 50% and to add a further amount of water before injecting the water-soluble initiator in order to obtain a weight ratio of about 40%.

The polyvinyl chloride powder obtained by the process of the present invention is separated from the polymerization medium in a conventional manner, e.g. by filtration, and it is unnecessary to subject it to special treatment or to add special additives. It may then be dried, e.g. in hot air, after which it is ready for use.

The process forming the object of the present invention is applicable to the homopolymerization of vinyl chloride and its copolymerization with up to 20% by weight of a copolymerizable ethylenically unsaturated comonomer such as vinyl acetate, ethylene, propylene and butylene. It is particularly applicable to the homopolymerization of vinyl chloride.

The process according to the present invention leads to the production of polyvinyl chloride powders that can be sintered and possess a low content, generally below 2 per mil by weight, of dispersing agent, a narrow particle size distribution, an average particle size of about 30 to 45 microns and low resistivity generally below 2 milliohms/dm$^2$.

These polyvinyl chloride powders are particularly suitable for use in the production of wettable battery separators having excellent electrical and mechanical properties. The conventional methods of producing battery separators from polyvinyl chloride powders can be used for this purpose.

The following examples are intended to illustrate the present invention without, however, restricting its scope.

Examples 1, 2 and 3 illustrate the process of the present invention. Example 4R which is a reference example relates to a polymerization during which no water-soluble initiator was added.

EXAMPLE 1

1,000 g of demineralized water, 0.75 g of sodium dodecyl benzene sulfonate in the form of a 10% by weight aqueous solution, 2 g of a commercially obtainable methyl cellulose powder sold under the trade name Methocel A 4C, and 1 g of dicetyl peroxydicarbonate are introduced successively at 20° C. with stirring (200 rpm) into a 4.5 liter reactor provided with a double jacket and a vertical blade stirrer. The reactor is closed and stirring is continued at 200 rpm for 5 minutes. Stirring is then stopped. The reactor is subjected to a partial vacuum (100 mm Hg absolute) and then purged with nitrogen (1360 mm Hg absolute) before restoring the same partial vacuum. 1000 g of vinyl chloride are then introduced. The stirrer is started up again (500 rpm) and stirring is continued for 30 minutes. The medium is heated to 58° C. When conversion reaches 75%, 0.25 g of ammonium persulfate are introduced into the reaction medium and polymerization is allowed to proceed until conversion reaches 92%. The aqueous suspension is degassed, by reducing the pressure to 360 mm Hg absolute, and the polymer is centrifuged and dried under conventional conditions (2½ hours at 70° C.).

EXAMPLE 2

This example is the same as Example 1, except that 0.3 g of sodium hydroxide is introduced into the aqueous charge after the introduction of the demineralized water.

EXAMPLE 3

This example is the same as Example 1, except that the ammonium persulfate is replaced by 0.6 g of hydrogen peroxide (100%).

EXAMPLE 4R

This example is the same as Example 1, except that no ammonium persulfate is introduced during polymerization.

The following Table I records the results of the particle size analysis of the polyvinyl chlorides obtained in accordance with Examples 1, 2, 3 and 4R.

TABLE I

| | Particle size analysis (by screening) | | | |
|---|---|---|---|---|
| Example No. | 1 | 2 | 3 | 4R |
| Mean diameter, microns | 38 | 32 | 43 | 39 |
| passing through a 65 micron screen, g/kg | 882 | 940 | 878 | 928 |
| retained on a 125 micron screen, g/kg | 4 | 2 | 6 | 2 |

A comparison of the results reveals that the delayed introduction of a water-soluble initiator has no appreciable effect on the particle size distribution of the polyvinyl chloride obtained by polymerization with the help of an oil-soluble initiator in the presence of a cellulose derivative and an anionic emulsifying agent.

The suitability for sintering of the polyvinyl chlorides obtained in accordance with Examples 1 to 4R was also assessed. To this end, battery separator components 0.4 mm thick were produced by applying the polyvinyl chloride powder, on a metallic substrate with a roller coater, using laboratory equipment.

Table II records the results of this assessment.

TABLE II

| | Suitability for sintering | | | |
|---|---|---|---|---|
| Example No. | 1 | 2 | 3 | 4R |
| Sintering temperature | 214 | 213 | 213 | 214 |
| Sintering time, min., sec. | 5 min 45 sec | 7 min 30 sec | 8 min 30 sec | 7 min 45 sec |
| Quality of sintering | good | good | good | very poor |
| Adhesion to metal | slight | slight | nil | very strong |

A comparison of the results of Examples 1, 2 and 3 with those of Example 4R shows that the delayed introduction of a water-soluble initiator has a very marked effect on the suitability of the resulting polyvinyl chloride powders for sintering. Thus, the polyvinyl chloride powder produced in accordance with Example 4R adheres firmly to the metal substrate during coating and results in sintering of such poor quality that it is impossible to assess the ultimate breaking stress of the sintered test specimen. On the other hand, the polyvinyl chloride powders obtained in accordance with Examples 1, 2 and 3 exhibit little if any adhesion to the roller and result in good quality sintered test specimens with an ultimate breaking stress exceeding 50 kg/cm$^2$.

It will be understood that the above description of the present invention is susceptible to various modifications, changes and adaptations, and the same are intended to be comprehended within the meaning and range of equivalents of the appended claims.

What is claimed is:

1. Process for the production of polyvinyl chloride powder suitable for making battery separators by the polymerization of vinyl chloride in aqueous suspension in the presence of an oil-soluble free radical polymerization initiator and a dispersing agent system comprising a cellulose ether and an anionic emulsifying agent, and separation of the polyvinyl chloride powder in a conventional manner after termination of polymerization, consisting essentially of: carrying out the polymerization initially with an oil-soluble initiator, and adding a water-soluble free radical polymerization initiator during polymerization after conversion reaches at least 60%.

2. Process as in claim 1, wherein the water-soluble initiator is added before conversion exceeds 80%.

3. Process as in claim 1, wherein the water-soluble initiator is added after conversion has reached 70%.

4. Process as in claim 1, wherein polymerization is terminated when conversion reaches 85 to 95%.

5. Process as in claim 1, wherein the water-soluble initiator is at least one compound selected from the group consisting of alkali metal persulfate, ammonium persulfate and hydrogen peroxide, and is used in an amount of from 0.1 to 3 per mil by weight of the vinyl chloride employed.

6. Process as in claim 1, wherein the cellulose derivative is at least one compound selected from the group consisting of the alkyl celluloses, the hydroxy alkyl celluloses and the (hydroxy alkyl) alkyl celluloses, and is used in an amount of between 1 and 5 per mil by weight of the vinyl chloride employed.

7. Process as in claim 6, wherein the cellulose derivative is an alkyl cellulose.

8. Process as in claim 1, wherein the anionic emulsifying agent is at least one compound selected from the group consisting of alkali metal salts of alkyl sulfonic, alkyl arene sulfonic and aryl sulfonic acids, and is used in an amount of from 0.1 to 2 per mil by weight of the vinyl chloride employed.

9. Process as in claim 8, wherein the anionic emulsifying agent is an alkali metal salt of an alkyl arene sulfonic acid.

10. A process for making a separator plate for batteries and accumulators comprising employing the polyvinyl chloride powders obtained in accordance with the process of claim 1.

* * * * *